United States Patent
Miyoshi (10) Patent No.: US 7,599,401 B2
(45) Date of Patent: Oct. 6, 2009

(54) TRANSMISSION DEVICE AND TRANSMISSION METHOD

(75) Inventor: Kenichi Miyoshi, Yokohama (JP)

(73) Assignee: Panasonic Corporation, Osaka (JP)

( * ) Notice: Subject to any disclaimer, the term of this patent is extended or adjusted under 35 U.S.C. 154(b) by 451 days.

(21) Appl. No.: 10/544,389

(22) PCT Filed: Feb. 5, 2004

(86) PCT No.: PCT/JP2004/001193

§ 371 (c)(1),
(2), (4) Date: Aug. 3, 2005

(87) PCT Pub. No.: WO2004/070980

PCT Pub. Date: Aug. 19, 2004

(65) Prior Publication Data

US 2006/0056462 A1  Mar. 16, 2006

(30) Foreign Application Priority Data

Feb. 6, 2003 (JP) .............................. 2003-029340

(51) Int. Cl.
*H04J 3/12* (2006.01)
(52) U.S. Cl. ................... 370/528; 370/334; 370/517
(58) Field of Classification Search .............. 455/69, 455/278.1; 370/504, 528, 334, 517
See application file for complete search history.

(56) References Cited

U.S. PATENT DOCUMENTS 4,774,707 A * 9/1988 Raychaudhuri ............. 370/447

5,838,746 A * 11/1998 Bellec ........................ 375/365

(Continued)

FOREIGN PATENT DOCUMENTS

EP    1028544    8/2000

(Continued)

OTHER PUBLICATIONS

I. Jeong, et al.; "A Time Division Duplex CDMA System Using Asymmetric Modulation Scheme in Duplex Channel," IEICE Transaction on communication, vol. E82-B, No. 12, Dec. 1999, pp. 1956-1963.

(Continued)

*Primary Examiner*—Ricky Ngo
*Assistant Examiner*—Dewanda Samuel
(74) *Attorney, Agent, or Firm*—Dickinson Wright, PLLC (57) ABSTRACT

A GI insertion section 105 inserts a guard interval into transmission data. Delay addition sections 107-1, 107-2 set a delay time in the transmission data. An arrival time calculation section 115 calculates for each directivity an arrival time after data is transmitted from the other party of communication until the data is received from received data of each directivity. A delay time determining section 116 calculates a difference in the arrival time between transmission data transmitted with two directivities and sets the calculated arrival time difference in the transmission data to be transmitted with the directivity corresponding to the smaller arrival time as a delay time. A GI length determining section 117 sets a minimum arrival time of the calculated arrival times as a guard interval. This allows a transmission rate to be improved by shortening the length of a guard interval in a radio communication system to which a system of transmitting an OFDM signal with a directivity is applied.

6 Claims, 5 Drawing Sheets

U.S. PATENT DOCUMENTS

| | | | |
|---|---|---|---|
| 6,522,866 B1* | 2/2003 | Merkle et al. | 455/59 |
| 6,714,511 B1 | 3/2004 | Sudo et al. | |
| 6,822,607 B2* | 11/2004 | Tanaka et al. | 342/377 |
| 6,956,814 B1* | 10/2005 | Campanella | 370/210 |
| 6,983,008 B2* | 1/2006 | Mesecher | 375/130 |
| 6,999,406 B2* | 2/2006 | Takahashi et al. | 370/208 |
| 7,043,275 B2* | 5/2006 | Matsuoka et al. | 455/562.1 |
| 7,069,054 B2* | 6/2006 | Doi et al. | 455/562.1 |
| 7,206,361 B2* | 4/2007 | Foxcroft et al. | 375/324 |
| 2001/0033547 A1 | 10/2001 | Izumi | |
| 2001/0033623 A1* | 10/2001 | Hosur | 375/267 |
| 2004/0246889 A1* | 12/2004 | Ogawa et al. | 370/210 |

FOREIGN PATENT DOCUMENTS

| | | |
|---|---|---|
| JP | 09181699 | 7/1997 |
| JP | 2000 22612 | 1/2000 |
| JP | 2000 244377 | 9/2000 |
| JP | 2000 244441 | 9/2000 |
| JP | 2001 069110 | 3/2001 |
| JP | 2001 358626 | 12/2001 |
| JP | 2002 247005 | 8/2002 |
| JP | 2002 374223 | 12/2002 |
| JP | 2003 032207 | 1/2003 |

OTHER PUBLICATIONS

T. Fujii, et al.; "MC-CDMA Soshin Path Diversity ni Okeru Kaku Subcarrier Soshin Iso Seigyo," 2002 Nen The Institute of Electronics, Information and Communication Engineers Tsushin Society Taikai Koen Ronbunshu, Tushin 1 Mar. 3, 2002, p. 333.

* cited by examiner

TRANSMISSION DEVICE AND TRANSMISSION METHOD

TECHNICAL FIELD

The present invention relates to a transmission apparatus and transmission method, and more particularly, to a transmission apparatus and transmission method for transmitting data according to an OFDM scheme with, for example, guard intervals inserted.

BACKGROUND ART

In a mobile communication system, an OFDM scheme is under study. OFDM uses a low symbol rate per carrier, and therefore using OFDM alone makes a system resistant to multipaths. Introducing guard intervals makes the system even more resistant to multipaths. Guard intervals can be realized by copying the waveform of a posterior portion of symbol data to the beginning of the symbol data. In this way, it is possible to correctly receive signals for a delay signals having a length shorter than the guard interval length in an OFDM communication. However, since guard intervals do not have a role as data sections, the transmission rate improves when guard intervals are as short as possible.

On the other hand, a system which sends an OFDM signal with directivity added thereto is also under study. In the system which transmits data with directivity, a base station transmits a signal with directivity oriented in the direction of arrival of an incoming signal from a mobile station. When there is a plurality of directions of arrival, the base station transmits data in the direction in which data is received with maximum power from the mobile station or transmits data with a plurality of directivities in the respective directions. The receiving side can obtain a path diversity effect from such signals transmitted with a plurality of directivities, and can thereby obtain data of good quality with fewer errors.

However, large delay time differences are produced among arriving signals transmitted with a plurality of directivities through their respective paths, and therefore the delay time differences may exceed a range of guard intervals unless sufficiently long guard intervals are inserted in transmission data compared to a case where signals are transmitted with a single directivity. In order to prevent delay time differences from exceeding the guard interval range, there is a scheme under which data is transmitted with a guard interval having the same length as a maximum arrival time among arrival times for the respective directivities after data is transmitted until the other party of communication receives the data. According to this scheme, even when large delay time differences are produced among incoming signals in their respective paths, the delay time differences fall within the guard interval range, and therefore no interference is produced among symbols.

However, in the case of a conventional transmission apparatus and transmission method, when data is transmitted with a plurality of directivities, a guard interval having the same length as that of the maximum arrival time among arrival times of the respective directivities is inserted, it is always necessary to design guard intervals according to the maximum arrival time, which leads to a problem that guard intervals are longer compared to a system in which signals are transmitted with a single directivity.

DISCLOSURE OF INVENTION

It is an object of the present invention to provide a transmission apparatus and transmission method in a radio communication system using a system whereby an OFDM signal is transmitted with directivity, capable of improving the transmission rate by reducing the lengths of guard intervals.

This object can be attained by setting the lengths of guard intervals and delay times for respective directivities when transmission data is transmitted based on information on arrival times of the respective directivities after data is transmitted until the other party of communication receives the data, inserting the guard intervals of the set lengths in transmission data and transmitting the transmission data with a plurality of directivities according to the set delay times.

BEST MODE FOR CARRYING OUT THE INVENTION

With reference now to the attached drawings, embodiments of the present invention will be explained in detail below.

EMBODIMENT 1

Figure 1:
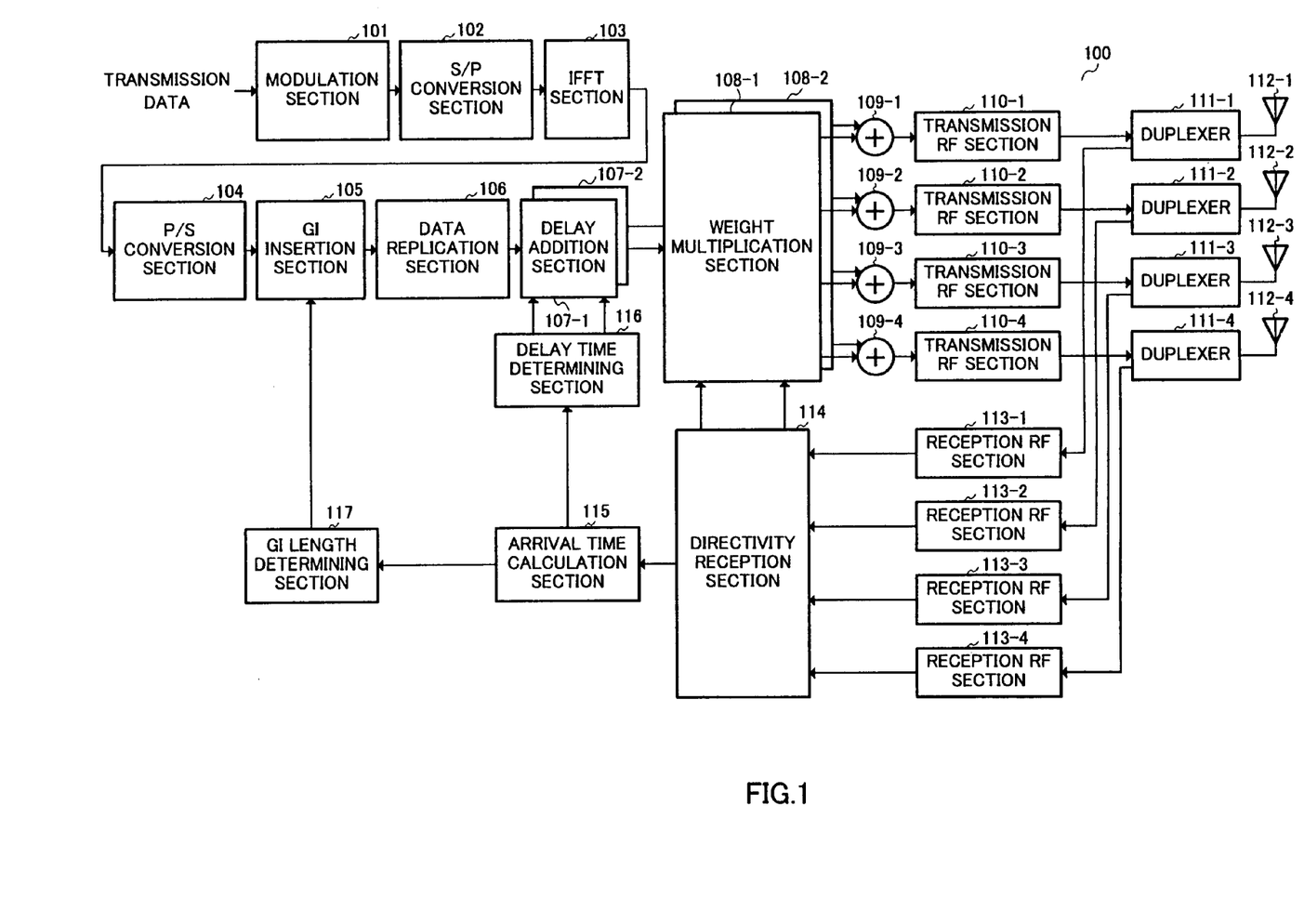
FIG. 1 is a block diagram showing the configuration of a base station apparatus according to Embodiment 1 of the present invention.

FIG. 1 is a block diagram showing the configuration of a base station apparatus 100 provided with a transmission apparatus according to Embodiment 1.

A modulation section 101 modulates transmission data and outputs the transmission data to an S/P conversion section 102.

The S/P conversion section 102 converts the transmission data input from the modulation section 101 from a serial data format to a parallel data format and outputs the parallel data to an IFFT section 103.

The IFFT section 103 applies inverse fast Fourier transform processing to the transmission data input from the S/P conversion section 102 and outputs the processed data to a P/S conversion section 104.

The P/S conversion section 104 converts the transmission data input from the IFFT section 103 from a parallel data format to a serial data format and outputs the serial data to a GI insertion section 105.

The GI insertion section 105 inserts a guard interval having a length determined by a GI length determining section 117 into the transmission data input from the P/S conversion section 104 and outputs the transmission data to a data replication section 106.

The data replication section 106 replicates the transmission data input from the GI insertion section 105 into two lines of data and outputs the data to delay addition sections 107-1, 107-2. The transmission data is to be transmitted with directivities different between the two lines.

The delay addition sections 107-1, 107-2 set a delay time determined by a delay time determining section 116 in the transmission data input from the data replication section 106 and outputs the transmission data with delay times to weight multiplication sections 108-1, 108-2.

The weight multiplication sections 108-1, 108-2, which are transmission sections, assign weights to the transmission data input from the delay addition sections 107-1, 107-2 based on information on a directivity of a desired signal with maximum reception power input from a directivity reception section 114 and output the two lines of transmission data to as many adders 109-1 to 109-4 as antennas.

The adders 109-1 to 109-4 add up the two lines of transmission data input from the weight multiplication sections 108-1, 108-2 and output the transmission data to transmission RF sections 110-1 to 110-4.

The transmission RF sections 110-1 to 110-4 apply processing such as up-conversion from a baseband frequency to a radio frequency to the transmission data input from the adders 109-1 to 109-4, amplify the processed data and output to duplexers 111-1 to 111-4.

The duplexers 111-1 to 111-4 transmit the transmission data input from the transmission RF sections 110-1 to 110-4 with directivities from antennas 112-1 to 112-4 and output signals received from the antennas 112-1 to 112-4 to reception RF sections 113-1 to 113-4.

The reception RF sections 113-1 to 113-4 apply processing such as down-conversion from a radio frequency to a baseband frequency to the received data input from the duplexers 111-1 to 111-4 and output the processed data to a directivity reception section 114.

The directivity reception section 114 forms two directivities using the received data input from the reception RF sections 113-1 to 113-4 and performs reception processing using the directivities formed. The directivity reception section 114 selects a directivity of a desired signal having maximum reception power from the result of signals received with directivity and outputs the information on the selected directivity to the weight multiplication sections 108-1, 108-2. Furthermore, after carrying out reception processing, the directivity reception section 114 outputs the received data to an arrival time calculation section 115.

The arrival time calculation section 115, which is an arrival time information acquisition section, calculates an arrival time after the other party of communication transmits a signal until the base station apparatus 100 receives the signal from the received data input from the directivity reception section 114 and outputs the information on the calculated arrival time to the GI length determining section 117 and the delay time determining section 116.

The delay time determining section 116 determines a relative delay time (transmission delay time) of transmission data to be transmitted with respective directivities based on the information on the arrival time of the two directivities input from the arrival time calculation section 115. The delay time determining section 116 controls the delay addition sections 107-1, 107-2 so that the delay times determined for the respective directivities are set. A delay time is equal to a difference between arrival times of two directivities and set in transmission data to be transmitted with the directivity corresponding to the smaller arrival time.

The GI length determining section 117 selects the smaller arrival time out of the arrival times of the two directivities based on the information on the arrival times input from the arrival time calculation section 115 and outputs the information on the selected arrival time to the GI insertion section 105.

Next, a scheme for setting a delay time for each directivity will be explained using FIG. 2 to FIG. 5.

Figure 2:
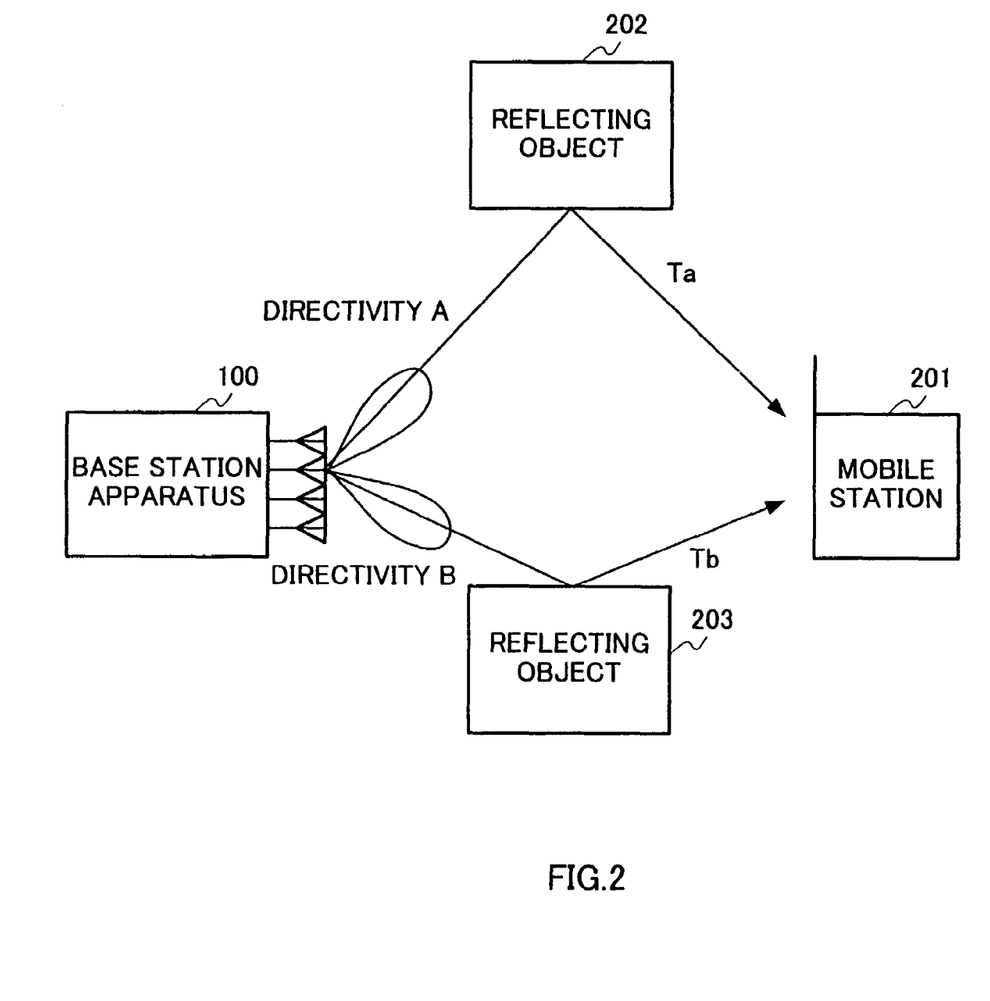
FIG. 2 is a schematic view illustrating a state in which a signal is transmitted with directivity from a base station apparatus to a mobile station.

In FIG. 2, the base station apparatus 100 has the configuration shown in FIG. 1 and a mobile station 201 which is the other party of communication is a conventional common mobile station. The same data transmitted from the base station apparatus 100 with directivity A (first directivity) and directivity B (second directivity) are reflected by reflecting objects 202, 203 such as buildings and arrive at the mobile station 201. In this case, the transmission data transmitted with the directivity A and transmission data transmitted with the directivity B from the base station apparatus 100 arrive at the mobile station 201 at different arrival times Ta (first arrival time) and Tb (second arrival time) (Ta>Tb). In this case, by delaying the transmission timing of the transmission data transmitted from the base station apparatus 100 with a directivity B with respect to the transmission timing of the transmission data transmitted with a directivity A by Ta−Tb, it is possible to set the length of a guard interval of the transmission data transmitted from the base station apparatus 100 to the arrival time Tb of the directivity B whose arrival time is smaller. That is, with regard to the received data received with the directivity A and directivity B by the mobile station 201, even when the length of the guard interval is set to Tb, no interference occurs between symbols because the delay time of the delay wave with respect to the advance wave is shorter than a guard interval. The reason will be explained below.

Figure 3:
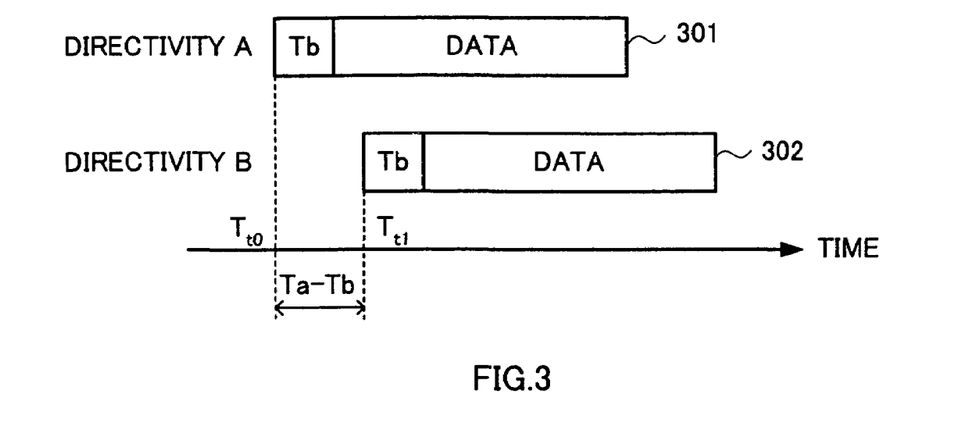
FIG. 3 illustrates a transmission timing when a guard interval is Tb.
Figure 4:
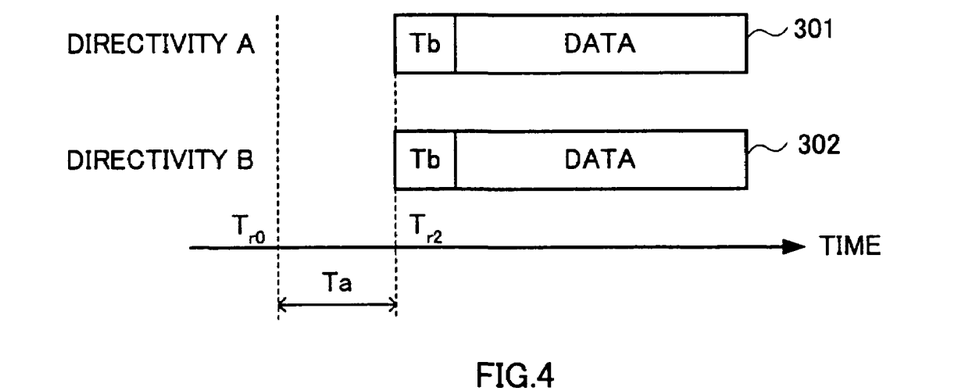
FIG. 4 illustrates a reception timing when a guard interval is Tb.

FIG. 3 and FIG. 4 show a transmission timing and a reception timing when the guard interval is set to Tb in the case of FIG. 2. FIG. 3 shows a transmission timing at the base station apparatus and FIG. 4 shows a reception timing at the mobile station. In FIG. 3 and FIG. 4, the horizontal axis shows time.

As shown in FIG. 3, the base station apparatus delays the transmission timing of transmission data 302 transmitted with the directivity B by Ta−Tb with respect to the transmission timing of transmission data 301 transmitted with the directivity A. That is, the transmission data 302 with the directivity B is transmitted at time $Tt_1$ which is Ta−Tb behind time $Tt_0$ at which the transmission data 301 with the directivity A is transmitted.

Then, as shown in FIG. 4, the transmission data 301 transmitted with the directivity A arrives at the mobile station at time $Tr_2$ after a lapse of the arrival time Ta from the time $Tr_0$. On the other hand, the transmission data 302 transmitted with the directivity B arrives at the mobile station after a lapse of the arrival time Tb from the time $Tr_0$, and therefore when the delay time Ta−Tb set by the base station apparatus is added, the data arrives at the mobile station at the time $Tr_2$ after a lapse of the arrival time Ta from the time $Tr_0$.

After all, the transmission data 301 transmitted with the directivity A and the transmission data 302 transmitted with the directivity B arrive at the same time $Tr_2$ and with regard to the guard interval of the directivity A and the guard interval of the directivity B, the delay time difference between the two never exceeds the range of their guard intervals, and therefore no interference occurs between symbols even when the length of the guard interval of the transmission data is set to Tb.

Thus, according to the transmission apparatus and transmission method of this Embodiment 1, the GI insertion section inserts the smaller arrival time out of arrival times with respective directivities as a guard interval and the delay addition section delays the transmission data transmitted with a directivity with the smaller arrival time by the difference between the arrival times with the respective directivities, and therefore the delay time difference of the received data never exceeds the range of guard intervals and no interference between symbols occurs, and it is thereby possible to reduce the lengths of guard intervals and improve the transmission rate. Furthermore, the transmission apparatus and transmission method of this Embodiment 1 eliminates the necessity for a circuit which adjusts the delay time difference so as to fall within the range of guard intervals and which is conventionally required on the receiving side, and therefore it is possible to make the circuit of the receiver as simple as possible and downsize the receiver compared to the conventional example.

EMBODIMENT 2

Figure 5:
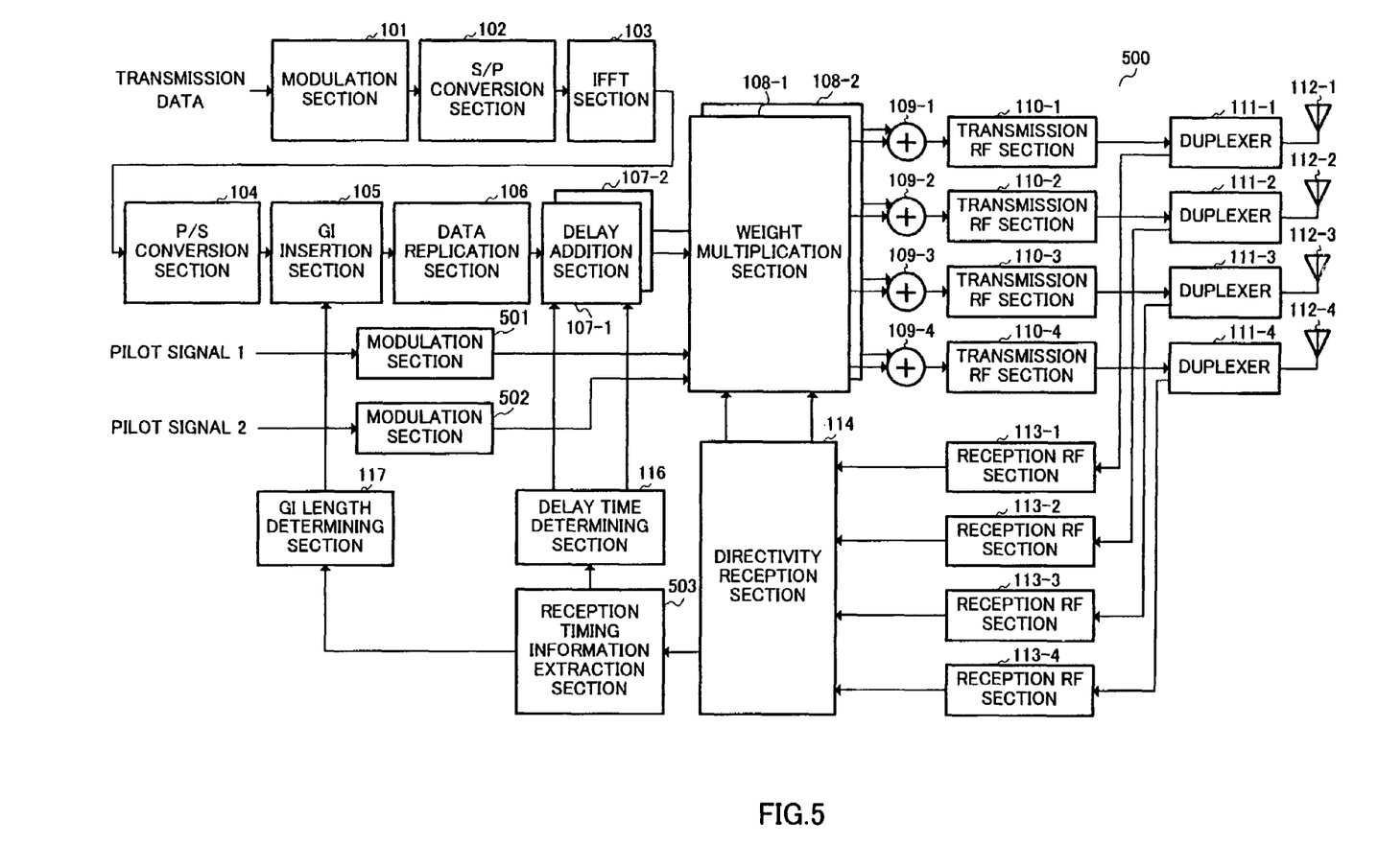
FIG. 5 is a block diagram showing the configuration of a base station apparatus according to Embodiment 2 of the present invention.
Figure 6:
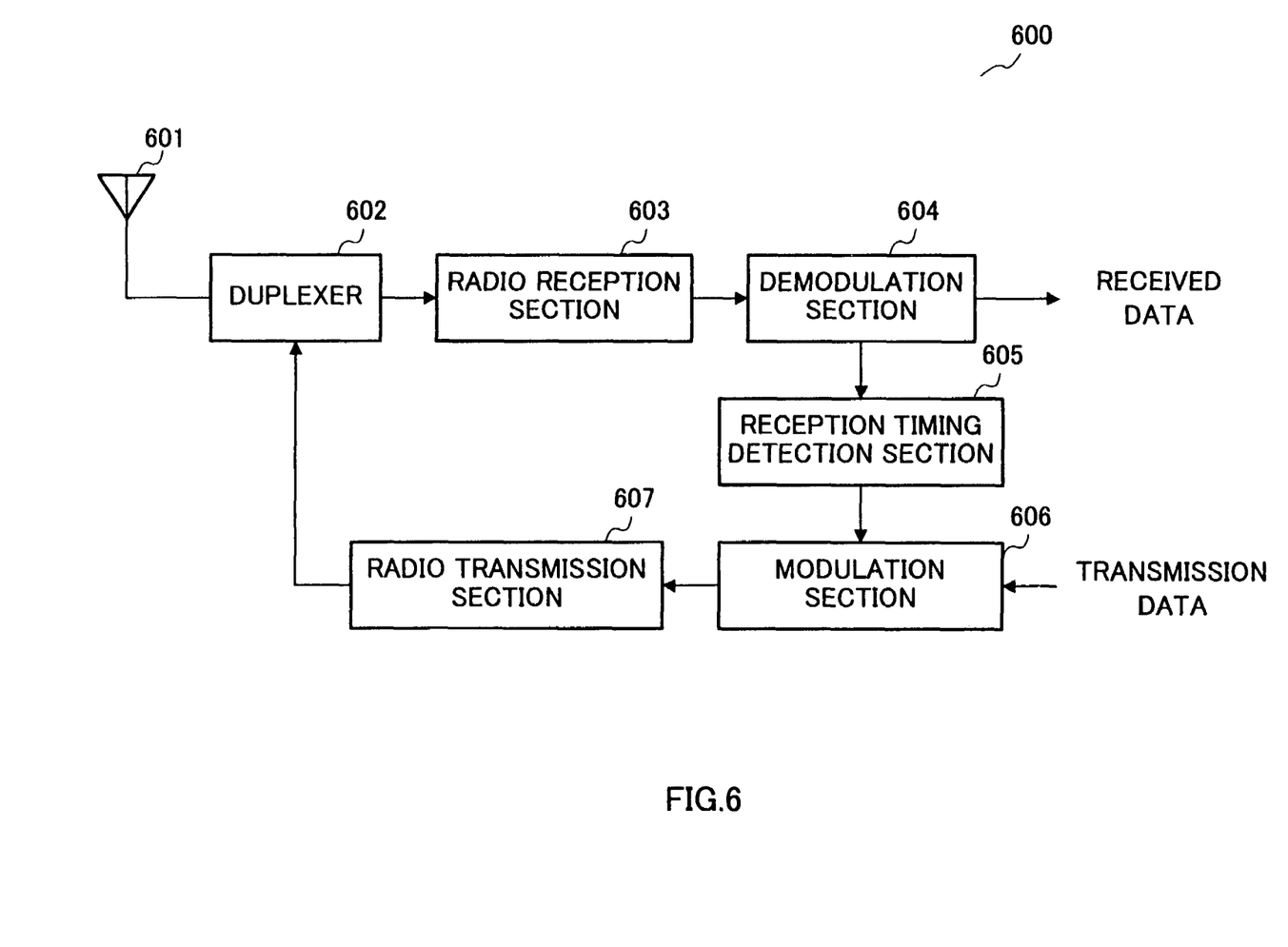
FIG. 6 is a block diagram showing the configuration of a mobile station according to Embodiment 2 of the present invention.

FIG. 5 illustrates the configuration of a base station apparatus 500 provided with a transmission apparatus according to this Embodiment 2 and FIG. 6 illustrates the configuration of a mobile station 600 which is the other party of communication of the transmission apparatus according to this Embodiment 2.

The base station apparatus 500 according to Embodiment 2 of the present invention corresponds to the base station apparatus 100 according to Embodiment 1 of the present invention shown in FIG. 1 with a modulation section 501 and a modulation section 502 added and the arrival time calculation section 115 replaced by a reception timing information extraction section 503. The components having the same configuration as that in FIG. 1 are assigned the same reference numerals and explanations thereof will be omitted.

First, the configuration of the base station apparatus 500 will be explained.

The modulation section 501 modulates a pilot signal 1 and outputs the pilot signal to weight multiplication sections 108-1, 108-2.

The modulation section 502 modulates a pilot signal 2 and outputs the pilot signal to weight multiplication sections 108-1, 108-2. The pilot signal 1 and pilot signal 2 are pilot signals having different bit patterns. Furthermore, any different pilot signals can be used when not only the pilot signals have different bit patterns but also the pilot signals can be distinguished from data.

The reception timing information extraction section 503, which is an arrival time information section, extracts reception timing information (information on an arrival time) of each directivity from received data input from a directivity reception section 114 and outputs the reception timing information to a GI length determining section 117 and a delay time determining section 116. The reception timing information is information on timings at which the pilot signal 1 and pilot signal 2 are transmitted with different directivities simultaneously and timings at which the other party of communication receives the pilot signal 1 and pilot signal 2.

Next, the configuration of the mobile station 600 will be explained using FIG. 6.

An antenna 601 outputs received data with a plurality of directivities to a duplexer 602 and transmits transmission data output from the duplexer 602. The received data received by the antenna 601 includes the pilot signal 1 and pilot signal 2 transmitted from the base station apparatus 500. Furthermore, the transmission data transmitted from the antenna 601 includes reception timing information which is information on a difference between the reception timing of the pilot signal 1 and the reception timing of the pilot signal 2.

The duplexer 602 separates received data from transmission data, outputs the data received at the antenna 601 to a radio reception section 603 and transmits transmission data input from a radio transmission section 607 from the antenna 601.

The radio reception section 603 down-converts the received data input from the duplexer 602 from a radiofrequency to a baseband frequency and outputs the received data to a demodulation section 604.

The demodulation section 604 demodulates the received data input from the radio reception section 603, obtains the received data and outputs the demodulation result to a reception timing detection section 605.

The reception timing detection section 605 detects reception timings corresponding to the directivity of the pilot signal 1 and directivity of the pilot signal 2 from the received data input from the radio reception section 603 and outputs reception timing information on the respective detected directivities to a modulation section 606.

The modulation section 606 modulates transmission data including the reception timing information input from the reception timing detection section 605 and outputs the modulated transmission data to the radio transmission section 607.

The radio transmission section 607 up-converts the transmission data input from the modulation section 606 from a baseband frequency to a radio frequency and outputs the transmission data to the duplexer 602.

Next, the operations of the base station apparatus 500 and mobile station 600 will be explained using FIG. 2, FIG. 5 and FIG. 6.

The pilot signal 1 and pilot signal 2 are modulated by the modulation sections 501, 502, weighted by weight multiplication sections 108-1, 108-2 and then transmitted with different directivities simultaneously. At this time, the base station apparatus 500 transmits the pilot signal 1 with directivity A and transmits the pilot signal 2 with directivity B.

Next, in the mobile station 600 which has received the pilot signal 1 and pilot signal 2, the reception timing detection section 605 detects reception timings of the directivity A and directivity B and transmits the transmission data with the detected reception timing information included therein to the base station apparatus 500. In the base station apparatus 500 which has received the received data including the reception timing information, the reception timing information extraction section 503 extracts the reception timing information from the received data, the GI length determining section 117 selects a maximum delay time of the minimum directivity B among maximum delay times of the respective directivities as a GI length and a GI insertion section 105 inserts a guard interval having the same time as the delay time of the directivity B into the transmission data to be transmitted with the directivity A and directivity B. Furthermore, delay addition sections 107-1, 107-2 set a delay time of Ta−Tb from transmission time $Tt_0$ of the transmission data with the directivity A for the transmission data with the directivity B from the reception timing information and transmits the transmission data with the directivity A and directivity B. The method of setting a guard interval and the method of setting a delay time for the transmission data are the same as those in Embodiment 1, and therefore detailed explanations thereof will be omitted.

Thus, in addition to the effect of Embodiment 1 above, the transmission apparatus and transmission method according to this Embodiment 2 can adjust a directivity with which pilot signals are transmitted and a directivity with which data is transmitted so as to precisely coincide with each other, and can thereby insert a guard interval with fewer errors and with high precision by determining the length of the guard interval based on the information on an arrival time detected using pilot signals. Furthermore, the transmission apparatus and transmission method according to this Embodiment 2 allows the arrival time of each directivity to be known based on a reception timing at a mobile station of a pilot signal transmitted from a base station apparatus, and therefore this embodiment is also applicable to a base station apparatus which communicates with a mobile station to which data is not transmitted with directivity.

Embodiment 1 and Embodiment 2 assume that the same transmission data are transmitted with two directivities; directivity A and directivity B, but the present invention is not limited to this and it is also possible to transmit the same transmission data with three or more directivities. In this case, even when the guard interval to be inserted into transmission data to be transmitted with all directivities is set to the same arrival time corresponding to a directivity of a minimum arrival time, no interference between symbols occurs.

Furthermore, Embodiment 1 and Embodiment 2 assume that the same transmission data is transmitted with different directivities, but the present invention is not limited to this and it is also possible to transmit different transmission data with different directivities. Furthermore, Embodiment 1 and Embodiment 2 have described the case where the mobile station does not transmit data with directivity, but the present invention is not limited to this and it is also possible for the mobile station to transmit data with directivity.

Embodiment 1 and Embodiment 2 assume that transmission data is weighted at the weight multiplication section and transmitted with directivity, but the present invention is not limited to this and transmission data can also be transmitted with directivity without any weight assigned.

As explained so far, according to the present invention, a radio communication system to which a system of transmitting an OFDM signal with directivity is applied can improve its transmission rate by shortening the length of a guard interval.

This application is based on the Japanese Patent Application No. 2003-29340 filed on Feb. 6, 2003, entire content of which is expressly incorporated by reference herein.

INDUSTRIAL APPLICABILITY

The present invention relates to a transmission apparatus and transmission method and is suitable for use in, for example, a transmission apparatus and transmission method for transmitting data with a guard interval inserted under an OFDM scheme.

[FIG. 1]
TRANSMISSION DATA
101 MODULATION SECTION
102 S/P CONVERSION SECTION
103 IFFT SECTION
104 P/S CONVERSION SECTION
105 GI INSERTION SECTION
106 DATA REPLICATION SECTION
107-1 DELAY ADDITION SECTION
116 DELAY TIME DETERMINING SECTION
117 GI LENGTH DETERMINING SECTION
115 ARRIVAL TIME CALCULATION SECTION
108-1 WEIGHT MULTIPLICATION SECTION
114 DIRECTIVITY RECEPTION SECTION
110-1 TRANSMISSION RF SECTION
110-2 TRANSMISSION RF SECTION
110-3 TRANSMISSION RF SECTION
110-4 TRANSMISSION RF SECTION
113-1 RECEPTION RF SECTION
113-2 RECEPTION RF SECTION
113-3 RECEPTION RF SECTION
113-4 RECEPTION RF SECTION
111-1 DUPLEXER
111-2 DUPLEXER
111-3 DUPLEXER
111-4 DUPLEXER

[FIG. 2]
202 REFLECTING OBJECT
DIRECTIVITY A
100 BASE STATION APPARATUS
DIRECTIVITY B
203 REFLECTING OBJECT
201 MOBILE STATION

[FIG. 3]
DIRECTIVITY A
301 DATA
DIRECTIVITY B
302 DATA
TIME

[FIG. 4]
DIRECTIVITY A
301 DATA
DIRECTIVITY B
302 DATA
TIME

[FIG. 5]
TRANSMISSION DATA
101 MODULATION SECTION
102 S/P CONVERSION SECTION
103 IFFT SECTION
104 P/S CONVERSION SECTION
105 GI INSERTION SECTION
106 DATA REPLICATION SECTION
107-1 DELAY ADDITION SECTION
PILOT SIGNAL 1
PILOT SIGNAL 2
501 MODULATION SECTION
502 MODULATION SECTION
117 GI LENGTH DETERMINING SECTION
116 DELAY TIME DETERMINING SECTION
503 RECEPTION TIMING INFORMATION EXTRACTION SECTION
108-1 WEIGHT MULTIPLICATION SECTION
114 DIRECTIVITY RECEPTION SECTION
110-1 TRANSMISSION RF SECTION
110-2 TRANSMISSION RF SECTION
110-3 TRANSMISSION RF SECTION
110-4 TRANSMISSION RF SECTION
113-1 RECEPTION RF SECTION
113-2 RECEPTION RF SECTION
113-3 RECEPTION RF SECTION
113-4 RECEPTION RF SECTION
111-1 DUPLEXER
111-2 DUPLEXER
111-3 DUPLEXER
111-4 DUPLEXER

[FIG. 6]
602 DUPLEXER
608 RADIO RECEPTION SECTION
607 RADIO TRANSMISSION SECTION
604 DEMODULATION SECTION
RECEIVED DATA
605 RECEPTION TIMING DETECTION SECTION
606 MODULATION SECTION
TRANSMISSION DATA

What is claimed is:

1. A transmission apparatus comprising:
   an arrival time information acquisition section that acquires arrival time information showing a time transmission data takes to arrive at a communicating party per directivity;
   a guard interval insertion section that inserts in transmission data a guard interval having a length determined based on said arrival time information;
   a transmission delay section that sets a transmission delay time for transmission data per directivity based on said arrival time information; and
   a transmission section that transmits the same transmission data in a plurality of directivities.

2. The transmission apparatus according to claim 1, wherein
   said arrival time information acquisition section acquires information on a first arrival time of transmission data to be transmitted with a first directivity and information on a second arrival time, which is smaller than said first arrival time, of transmission data to be transmitted with a second directivity,
   said guard interval insertion section inserts the same length of guard interval as said second arrival time, and
   said transmission delay section delays the transmission timing of the transmission data to be transmitted with said second directivity by a difference between said first arrival time and said second arrival time with respect to the transmission timing of the transmission data to be transmitted with said first directivity.

3. The transmission apparatus according to claim 1, wherein
   said transmission section transmits a pilot signal which differs from one said directivity to another, and
   said arrival time information acquisition section acquires information on said arrival time by extracting information on the time after a pilot signal is transmitted until the other party of communication receives said pilot signal from the received signal.

4. A base station apparatus provided with a transmission apparatus, said transmission apparatus comprising:
   an arrival time information acquisition section that acquires information on an arrival time of each directivity after transmission data is transmitted until the other party of communication receives the transmission data;
   a guard interval insertion section that inserts a guard interval having a length determined based on said arrival time information into transmission data;
   a transmission delay section that sets a transmission delay time in transmission data for each said directivity based on said arrival time information; and
   a transmission section that transmits the same transmission data with a plurality of said directivities.

5. A communication terminal apparatus with a transmission apparatus, said transmission apparatus comprising:
   an arrival time information acquisition section that acquires arrival time information showing a time transmission data takes to arrive at a communicating party per directivity;
   a guard interval insertion section that inserts in transmission data a guard interval having a length determined based on said arrival time information;
   a transmission delay section that sets a transmission delay time for transmission data per directivity based on said arrival time information; and
   a transmission section that transmits the same transmission data in a plurality of directivities.

6. A transmission method comprising:
   acquiring a first arrival time showing a time transmission data takes to arrive at a communicating party in a first directivity;
   acquiring information about a second arrival time showing a time the transmission data takes to arrive at the communicating party in a second directivity, the second arrival time being shorter than said first arrival time;
   inserting in the transmission data a guard interval having a same length as said second arrival time;
   delaying the transmission timing of the transmission data to be transmitted in said second directivity by a difference between said first arrival time and said second arrival time with respect to the transmission timing of the transmission data to be transmitted in said first directivity; and
   transmitting the same transmission data in a plurality of directivities.

* * * * *

UNITED STATES PATENT AND TRADEMARK OFFICE
CERTIFICATE OF CORRECTION

| | | |
|---|---|---|
| PATENT NO. | : 7,599,401 B2 | Page 1 of 1 |
| APPLICATION NO. | : 10/544389 | |
| DATED | : October 6, 2009 | |
| INVENTOR(S) | : Kenichi Miyoshi | |

It is certified that error appears in the above-identified patent and that said Letters Patent is hereby corrected as shown below:

On the title page: Item (54): Title and Col. 1, line 2-3, currently reads:

(54) TRANSMISSION DEVICE AND TRANSMISSION METHOD and should read:

(54) APPARATUS AND METHOD FOR TRANSMISSION

Signed and Sealed this

Thirtieth Day of March, 2010

David J. Kappos
*Director of the United States Patent and Trademark Office*